Patented Apr. 6, 1926.

1,580,089

UNITED STATES PATENT OFFICE.

DEXTER N. SHAW, OF PHILADELPHIA, PENNSYLVANIA, ASSIGNOR TO THE GOODYEAR TIRE & RUBBER COMPANY, OF AKRON, OHIO, A CORPORATION OF OHIO.

PROCESS OF VULCANIZING CAOUTCHOUC AND PRODUCT OBTAINED THEREBY.

No Drawing.   Application filed November 18, 1924.   Serial No. 750,672.

*To all whom it may concern:*

Be it known that I, DEXTER N. SHAW, a citizen of the United States, and resident of Philadelphia, Pennsylvania, have invented new and useful Improvements in Processes of Vulcanizing Caoutchouc and Products Obtained Thereby, of which the following is a specification.

My invention relates to vulcanization of caoutchouc and caoutchouc compounds, and it has, for its primary object, the provision of accelerators of high curing power which will insure a product of high tensile strength and good aging qualities. More particularly, it is related to the use of isomers of nitrosocarbazole and their derivatives.

Carbazole is a by-product of the coal-tar industry and, though it has some use in the manufacture of dye-stuffs, the supply far exceeds the demand. By far the greater portion is used as a fuel, a crude solvent, or remains in the tar only to be used for paving purposes. Though the supply and demand have so adjusted themselves that the purified material is available only at a moderately high price, a new outlet will not only encourage competition for its recovery and thus eliminate this wasteful use of a valuable intermediate, but also reduce its unit cost.

I have found, that by treating carbazole with a solution of sodium nitrite and acid, a bright yellow flaky material is isolated, which has a melting point at about 82° C. This substance is probably formed by the following reaction:

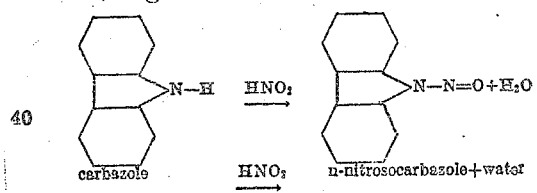

Though, in this form it is not suitable as a rapid accelerator, when treated with hydrochloric acid, in the presence of acetic acid, it undergoes a rearrangement which may be represented in the following manner:

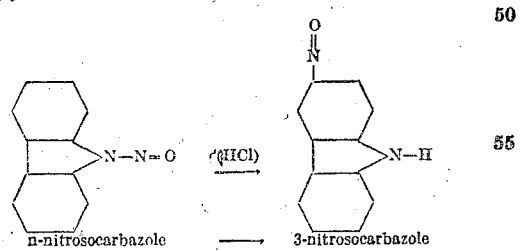

When 3-nitrosocarbazole is milled into a rubber mix, it shows some "scorching" effects, and, though it gives excellent results when used in the usual manner, I have found that its capacity to effect vulcanization at a low temperature is such that it may also be used in "air curing."

I have also found that the isomer having the nitroso group in position 3 can be prepared directly without first separating the normal or 1 nitroso derivative. By treating carbazole, dissolved in acetic acid and ether, with a metallic nitrite in the presence of water, the n-nitrosocarbazole is formed; but, with a sufficiently high concentration of acetic acid, it is not precipitated. On further treating this material with hydrochloric acid and allowing it to stand for some time, a green precipitate of the 3-nitrosocarbazole is obtained, which may be completely precipitated by diluting the mixture with water. As is commonly known, most inorganic acids are detrimental to vulcanization, so I have found that this material must be washed several times with water to remove any adsorbed acid.

The reaction for the preparation of 3-nitrosocarbazole is almost quantitative and I have had no difficulty in obtaining a 95% yield. The compound which results from the above procedure has no definite melting point, but decomposes between 150° and 160° C. I have incorporated this material in a stock having the following ratio of ingredients: 100 parts rubber, 5 parts activator, 6 parts sulfur, 1 part accelerator, and have obtained a satisfactory cure in 60 minutes by subjecting the mix to a temperature corresponding to 40 pounds steam pressure. The product has an elongation of 780%, at the breaking load of 112 kgs./cm.$^2$. Zinc oxide or litharge are to be preferred as activators, though salts of these metals can be used successfully.

It should be understood that I am neither limited by the examples nor the theories set forth by way of explanation and, though I have specifically described an accelerator that may be used in promoting the vulcanization of rubber, either with or without the aid of heat, it is obvious, that minor changes may be made in the application without departing from the scope thereof; I desire, therefore, that only such limitations shall be imposed as are required by prior art and the appended claims.

What I claim is:

1. A method of vulcanizing caoutchouc that comprises admixing caoutchouc with a vulcanizing agent, incorporating a nitrosocarbazole therein, mixing an activator therewith and applying heat.

2. A method of vulcanizing caoutchouc that comprises admixing caoutchouc with a vulcanizing agent, incorporating a nitrosocarbazole therein, and mixing an activator therewith.

3. A method of accelerating the vulcanization of caoutchouc that comprises vulcanizing the same in the presence of a nitrosocarbazole derivative.

4. The method of accelerating the vulcanization of caoutchouc that comprises vulcanizing the same in the presence of a carbazole derivative.

5. A method of vulcanizing caoutchouc that comprises admixing caoutchouc with a vulcanizing agent, incorporating 3-nitrosocarbazole therein, mixing an activator therewith and applying heat.

6. A method of vulcanizing caoutchouc that comprises admixing caoutchouc with a vulcanizing agent, incorporating 3-nitrosocarbazole therein and mixing an activator therewith.

7. A product formed by the reaction of caoutchouc, a vulcanizing agent, an activator and nitrosocarbazole.

8. A product formed by the reaction of caoutchouc, a vulcanizing agent, an activator and a derivative of nitrosocarbazole.

9. A product formed by the reaction of caoutchouc, a vulcanizing agent, an activator, and 3-nitrosocarbazole.

In witness whereof, I have hereunto signed my name.

DEXTER N. SHAW.